(12) United States Patent
Csabai et al.

(10) Patent No.: US 6,190,235 B1
(45) Date of Patent: Feb. 20, 2001

(54) METHOD AND APPARATUS FOR RECLAIMING USED ABRASIVES

(76) Inventors: Julius S. Csabai, 22 Normandy Road, Baie d'Urfé, Quebec (CA), H9X 3E6; Julius J. Csabai, 700 Victoria Drive, Baie d'Urfé (CA), H9X 2K4

( * ) Notice: Under 35 U.S.C. 154(b), the term of this patent shall be extended for 0 days.

(21) Appl. No.: 09/151,898

(22) Filed: Sep. 11, 1998

(51) Int. Cl.⁷ ....................................................... B24B 1/00
(52) U.S. Cl. ............................... 451/36; 451/60; 451/87; 209/138
(58) Field of Search ................... 451/36, 60, 87, 451/88; 209/138, 139.1, 474

(56) References Cited

U.S. PATENT DOCUMENTS

| | | |
|---|---|---|
| 3,392,491 * | 7/1968 | Vogt . |
| 4,115,256 * | 9/1978 | De Zeeuw . |
| 4,277,273 * | 7/1981 | Legille et al. . |
| 4,394,256 | 7/1983 | Goff ...................................... 209/135 |
| 4,737,270 * | 4/1988 | Phelps . |
| 4,946,044 | 8/1990 | Havrilla ................................ 209/474 |
| 5,197,398 * | 3/1993 | Levy et al. . |
| 5,392,922 | 2/1995 | Chen ........................................ 209/20 |
| 5,456,628 | 10/1995 | Csabai .................................... 451/36 |
| 5,622,265 | 4/1997 | Drenter et al. ....................... 209/221 |
| 5,657,876 | 8/1997 | Drenter et al. .................... 209/223.1 |

* cited by examiner

Primary Examiner—David A. Scherbel
Assistant Examiner—Willie Berry, Jr.
(74) Attorney, Agent, or Firm—George J. Primak

(57) ABSTRACT

A method and apparatus are provided for reclaiming used abrasives. This is done by achieving a turbulent levitating fluidized bed in an elongated enclosure which is provided with a porous bottom through which air is blown at a desired velocity. In the upper portion of the enclosure there is provided a plurality of suction hoods to remove airborne contaminants and fines from the fluidized bed, leaving only re-usable abrasives. The elongated enclosure can be vibrated, if desired. Also air may be heated to remove moisture from the used abrasives.

12 Claims, 2 Drawing Sheets

METHOD AND APPARATUS FOR RECLAIMING USED ABRASIVES

BACKGROUND OF THE INVENTION

1. Field of the Invention

This invention relates to an improved method and apparatus for reclaiming and thus recycling used abrasives that have been employed, for example, in surface preparation of steel objects prior to the application of paints or other protective coatings. More particularly, the novel method and apparatus provide for a fluidized bed treatment of the used abrasives with the assistance of suction, to remove contaminants and fines therefrom, thereby producing a high quality re-usable abrasive material well suited for subsequent blast cleaning operations.

2. Description of the Prior Art

Generally, the abrasive media falls into two categories, recyclable and expendable. Silica sand and slags are expendable, low cost abrasives and are, therefore, not considered recyclable. On the other hand, there are abrasives that do not easily break down at impact and are generally more expensive and worth recycling. Steelgrit, garnet, aluminum oxide, staurolite and hematite all belong to this group. Applicant's own U.S. Pat. No. 5,456,628 of Oct. 10, 1995 describes one such recyclable impact material.

The effect of the blast cleaning process on all abrasives resulting from high velocity impacting on steel surfaces being cleaned, causes them to abrade and generate contaminants such as dirt, paint, mill scale, and rust from the treated surface. At the same time a certain amount of fractured, fine abrasive particles are also produced. Generally, the used abrasive is considered reusable if the percentage of fines is not excessive and the contaminants can be extracted to a satisfactory level to meet health and environmental standards.

Various methods and equipment are employed in the abrasive blasting industry to allow spent abrasives to be reclaimed. Practically all presently employed abrasive recycling devices are operated on the principle that uses various air washing methods. In these methods, the relative densities of abrasives and contaminants are taken advantage of, because the abrasive is generally more dense than the contaminants. The contaminated abrasive is caused to fall along a vertical line, preferably in a continuous fashion, so that a uniform curtain of falling abrasive is obtained. An air stream is applied across the falling curtain with an objective to entrain the contaminants and the undesirable fractions of abrasive fines. Usually a cross-directional flow of the air stream is maintained so as to remove the undesirable part of the used abrasive in addition to the contaminants, and the decontaminated abrasive is then collected at the bottom of the cascading curtain for reuse. One such apparatus is described in U.S. Pat. No. 4,394,256 of Jul. 19, 1983.

In such a system, the uniformity of the falling curtain density is important because any opening or discontinuity in the curtain allows the air to accelerate. The resulting increased velocity at the fringe of such curtain openings or discontinuities also removes usable sizes of abrasive particles. On the other hand, reduced air velocity in the areas of denser curtain formation often results in incomplete washing. Such a system, therefore, has significant disadvantages.

Magnetic separation is also used to separate magnetically attractable abrasives from non-magnetically attractable contaminants. Such magnetic separation apparatus is disclosed, for example, in U.S. Pat. No. 5,657,876 of Aug. 19, 1997. This system can, however, be used only with magnetic materials, such as steel grit and shot, which excludes some 98% of the abrasives utilized by the industry.

There are also methods and apparatus using a combination of steps, including a physical separator, a rotary screen separator, a magnetic separator, and air wash separation and sub-atmospheric pressure, for example, as disclosed in U.S. Pat. No. 5,622,265 issued Apr. 22, 1997. Such systems are rather complex and expensive and thus have not achieved widespread acceptance in the industry.

OBJECTS AND SUMMARY OF THE INVENTION

It is an object of the present invention to obviate the above mentioned disadvantages and to provide an improved method and apparatus for reclaiming used abrasives based on a fluidized bed treatment thereof, with the assistance of suction.

Another object is to make such method and apparatus simple and efficient as well as applicable to all types of abrasives.

Other objects and advantages of the present invention will become apparent from the following description of the invention.

In essence, the method of the present invention for reclaiming used abrasives comprises forming a turbulent levitating fluidized bed of such used abrasives in a substantially horizontal elongated enclosure in which the fluidized abrasives are made to move from one end of the enclosure (charging end) to the other and thereof (discharging end), and removing contaminants and fines from the fluidized used abrasives by means of a plurality of suction outlets positioned in a predetermined sequence and at predetermined levels along the elongated enclosure.

The expression "turbulent levitating fluidized bed" means that the bed of used abrasives must be fluidized so as to rise within the elongated enclosure to a certain level, namely to levitate in the enclosure rather than to fill the enclosure completely as shown, for example, in U.S. Pat. No. 4,946,044 of Aug. 7, 1990 disclosing an aeration separator. Moreover, the levitating bed must be fluidized in such a manner as to make it turbulent or teetering. Such fluidized bed provides vigorous agitation or scrubbing action of the levitated used abrasives, which liberates the adhering contaminants, such as paint and coating residue, from the abrasive particles.

Such turbulent, levitating fluidized bed may be formed by blowing fluidizing air through a porous bottom of the elongated enclosure. To further assist in achieving satisfactory levitating fluidization, the elongated enclosure may be vibrated during the reclaiming process. Also, the fluidizing air may be heated to remove any moisture that may be present in the used abrasives.

To facilitate movement of the fluidized particles within the enclosure, the enclosure or its bottom surface is preferably tapered downward from its charging end to its discharging end.

The apparatus of the present invention comprises an elongated enclosure with a charging end and a discharging end and a porous bottom; means for continuously or intermittently charging used abrasives at the charging end; means for blowing air through the porous bottom of the elongated enclosure so as to form a turbulent levitating fluidized bed of the used abrasives having contaminants and fines therein; means for moving the fluidized bed of such abrasives along the elongated enclosure from the charging end to the discharging end; a plurality of suction outlets positioned in a predetermined sequence and at predetermined levels along the elongated enclosure such as to sequentially remove the contaminants and the fines from the used abrasives as they travel in the form of the turbulent levitating fluidized bed from the charging end to the discharging end of said elongated enclosure, thereby producing reclaimed abrasives at said discharging end; and means for collecting said reclaimed abrasives as they exit the discharging end of the elongated enclosure.

The elongated enclosure preferably has a generally U-shaped cross-section with a flat bottom which normally contains a multitude of micro-perforations producing micro-jets of blowing air that generate a turbulent levitating fluidized bed above the bottom surface. The elongated enclosure, or at least its bottom, is preferably tapering downward from its charging end to its discharge end so as to facilitate movement of the fluidized abrasives along the enclosure. Moreover, means are preferably provided to vibrate the elongated enclosure or at least its bottom, during the operation of the apparatus. Furthermore, means may be provided for heating the fluidizing air to remove moisture from the used abrasives in case they are wet or moist. Thus, the invention can be used both with dry and wet materials.

Concerning the suction outlets which remove contaminants and fines from the fluidized abrasives, they are normally in the form of hoods connected to a vacuum producing means, such as a vacuum generator and a dust collector. Preferably there are three such suction outlets positioned and arranged as follows: the first suction outlet which is positioned close to the charging end, is arranged so as to remove mostly volatile contaminants; the second suction outlet which is positioned substantially in the middle of the elongated enclosure, is arranged to remove less volatile contaminants and some fines; and the third suction outlet which is positioned close to the discharge end of the elongated enclosure is arranged to remove mostly fines to a desired particle size. The third suction outlet is usually provided with a higher degree of suction than the first and second outlets, and it may also be provided with slotted orifices positioned at adjustable levels so as to capture the heaviest fraction of the fines that is slated for removal. Of course, depending on the type of abrasives treated and on the desired degree of purity, only two suction outlets or four or more such outlets may be employed in order to achieve the desired result.

It is known that, according to Archimedes' theorem, loose granulated materials stratify according to their density in an air fluidized bed. This is disclosed, for instance, in U.S. Pat. No. 5,392,922 of Feb. 28, 1995 related to the separation of coal from waste rock. In that particular case, the coal floats while waste rock deposits on the bottom of the bed and is scraped to the sink discharge outlet.

Although essentially the same principle is used for the purposes of the present invention, it is the waste materials that are floated and removed herein using suction, leaving recycled abrasives that are suitable for re-use at the bottom.

Also according to Stoke's Law, the particle size, density and drag coefficient of the particulate material will influence the extent to which a vertically directed air stream will float various grain sizes of the particulate material, such as an abrasive. With this information, one can determine the velocity of the fluidizing air required to produce a desired levitation height for various fractions of the particulate materials treated, such that a predetermined particle size fraction may be taken out.

In addition to the proper levitation of the fluidized bed as described above, it is necessary that the fluidizing air be turbulent or teetering, meaning that a vigorous agitation of the particles be produced as they are levitated by the fluidizing air. This agitation or turbulence produces a strong scrubbing action in which adjacent particles are rubbed against each other, thereby loosening adhering contaminants and fines. This feature of the invention does not appear to be present in any prior art. The turbulence may be achieved in many different ways, but normally the bottom of the elongated enclosure is made of a porous material, such as fused or sintered metal powder or ceramics, or woven fabrics, which provide a multitude of passages that result in numerous vertically directed air streams rather than a homogeneous uniform upwardly rising air flow. Obviously other means, such as a pulsating air flow, may also be envisaged.

By the above described fluidizing process, most loose contaminants and light abrasive fines become airborne in the first section of the fluidizing zone to such a degree that the overhead air extraction outlet picks them up and transfers this lightest fraction of reject materials to the dust collector. As the air fluidized media slowly moves along the porous surface of the elongated enclosure, a second level of extraction takes place to remove the medium size contaminants and fines. Then, the abrasive cleaned out and separated from the light and medium size contaminants will go through the final stage of separation at the last zone of separation where a predetermined size fraction of the media is taken out. An air knife concept with adjustable height may be provided here to reach down to a desired level of fluidized media bed depth to extract the particle size fraction that is considered not useful in future blast cleaning operations.

To facilitate movement of the fluidized materials from one end to the other, the elongated enclosure or at least the bottom thereof, may be adjustably inclined from the feed or charging end to the discharge end of the enclosure. Moreover, vibrating the enclosure produces an important improvement since this enhances the teetering action or turbulence required for this invention. Thus, as the abrasive particles stay in air, suspended in a levitating fluidized bed, a controlled, high frequency vibration of the elongated enclosure or at least of its perforated bottom, greatly enhances the scrubbing action within the bed. The preferred frequency of vibration is over 1,000 cycles/min although lower frequencies may also be used. The importance of vibration was realized when it was discovered how this mechanical action increased the attrition scrubbing of fluidized abrasive particles. It was observed that the vibration is particularly effective when it is applied in a rotary motion wherein the amplitude follows a vertically oriented elliptical pattern. The degree of amplitude is not overly critical; about 0.5 cm is sufficient.

If the contaminated media to be recycled contains moisture, the fluidizing air is heated either electrically or by gas or oil, as it exits the fan. The temperature to which the air is heated depends on the level of moisture in the material, the ambient temperature and the material flow rate. All fines picked up by the suction outlets are directed into the dust collector for disposal while the cleaned abrasives are discharged into a collecting hopper or bag for re-use.

BRIEF DESCRIPTION OF THE DRAWINGS

The invention will further be described with reference to the accompanying drawings, in which.

DETAILED DESCRIPTION OF THE INVENTION

In all figures the same features or elements are identified by the same reference numbers.

Figure 1:
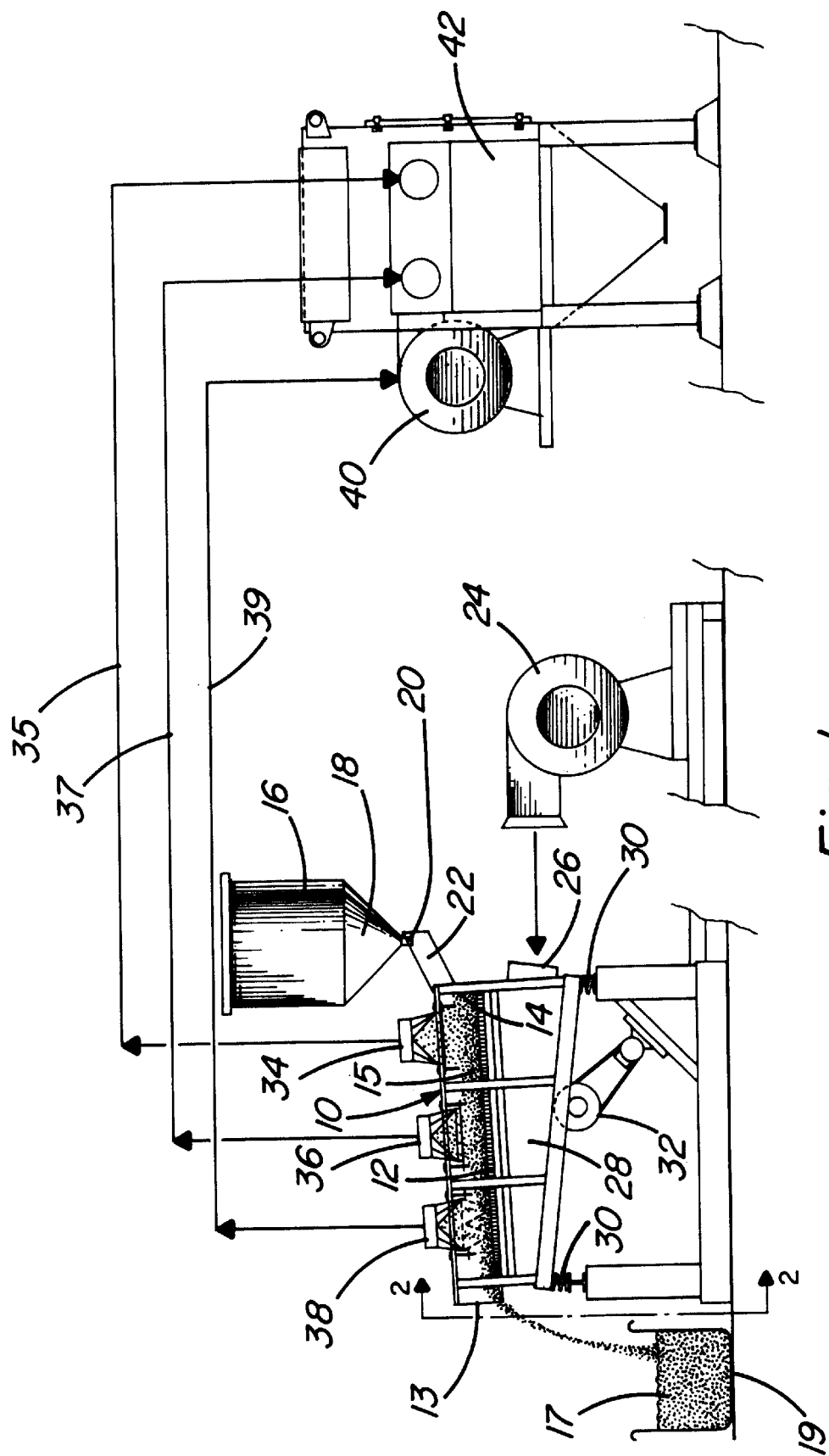
FIG. 1 is a side view of the apparatus pursuant to the present invention together with auxiliary components required for the method of operation of the invention.

FIG. 1 illustrates the preferred embodiment of the present invention wherein an inclined elongated enclosure 10 with a porous bottom 12 is fed at its charging end 14 with used abrasives having contaminants and fines included therewith. The used abrasives are fed from feeding hopper 16 with a conical or pyramidal bottom 18 having a sloping wall with a steep enough inclination to make the hopper self discharging. A metering device 20 is installed at the apex of the pyramidal or conical hopper bottom 18 to allow the used abrasive to be fed through feeder pan 22 and into the elongated enclosure 10 at a controlled rate. In the enclosure 10 the charged material is fluidized by blowing air through the porous bottom 12 by means of a blower 24. The air enters through opening 26 into air chamber 28 located below the elongated enclosure 10 and projects into this enclosure through the porous bottom 12 so as to form in the enclosure 10 a turbulent levitating fluidized bed 15. The bottom of the air chamber 28 is mounted on springs or resilient pads 30 and a vibratory engine 32 is provided to enable vibration of the structure consisting of the air chamber 28, the elongated enclosure 10 and the feeder pan 22. Such vibration enhances the formation of the turbulent levitating fluidized bed within the elongated enclosure 10.

In the upper portion of the elongated enclosure 10 there are provided suction hoods 34, 36 and 38 which are arranged in sequence along the enclosure 10 and at predetermined levels such that hood 34 will pick-up the lightest fraction of particles produces by the fluidized bed 15, hood 36 will pick-up the medium fraction and hood 38 will pick-up the heaviest fraction of the abrasives that needs to be removed. The suction is produced by a vacuum generator 40 and a dust collector 42 and the waste particles collected by the suction hoods 34, 36 and 38 proceed as shown by arrows 35, 37 and 39 to the dust collector 42 from which they are removed for disposal. The re-usable abrasives 17 are discharged from the discharge end 13 of the elongated enclosure 10 into collecting equipment 19. Such re-usable abrasives normally have a particle size between 2 mm and 0.2 mm.

Figure 2:
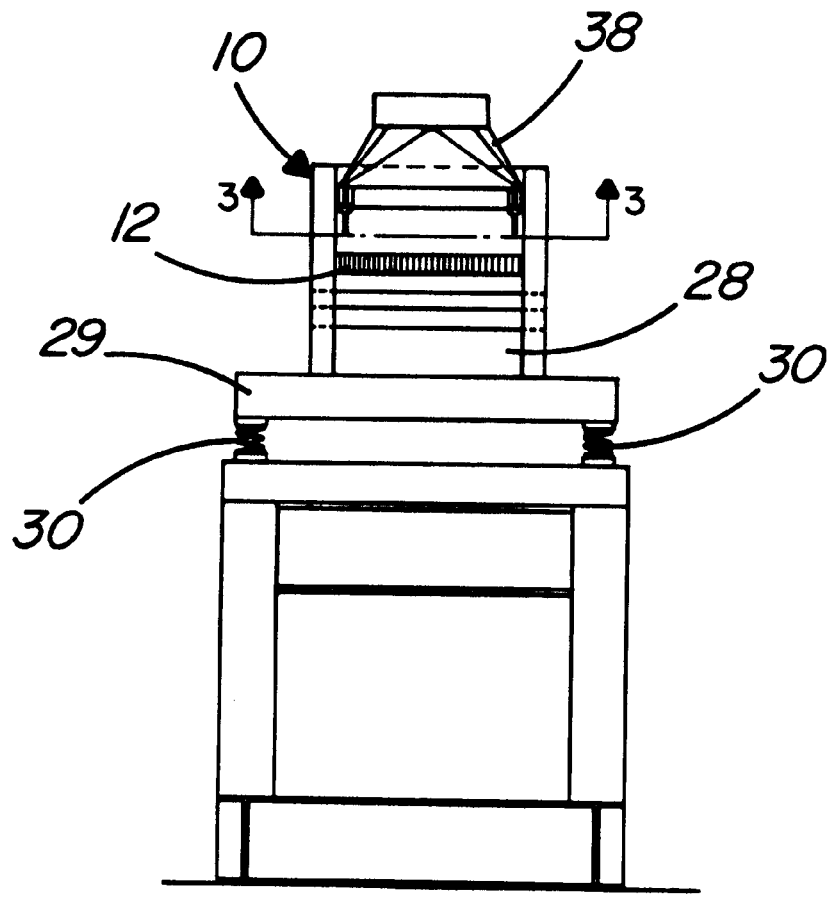
FIG. 2 is an end view along line 2—2 of FIG. 1.

FIG. 2 shows a view of the discharge end 13 of the apparatus of FIG. 1. As illustrated in this figure, the bottom beam 29 of the air chamber 28 is placed on springs 30 to permit vibration of the structure thereabove.

The elongated enclosure 10 has a porous bottom 12 through which air passes from chamber 28 and has an open top where suction hood 38 is located. The height at which the hood is positioned may be adjusted as required.

Figure 3:
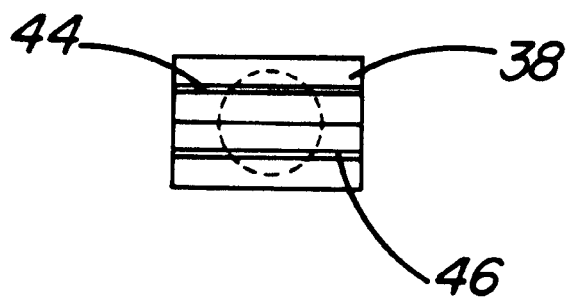
FIG. 3 is a section view along line 3—3 of FIG. 2.

FIG. 3 shows the cross-section of the hood 38 along line 3—3. As illustrated herein, the hood has two slotted orifices 44 and 46 which are adjustable in height and which make it possible to achieve a strong suction to remove the heaviest undersized fraction of the spent abrasives being treated.

This particular hood 38 is connected to the part of the vacuum generator 40 (see FIG. 1) which produces the highest degree of vacuum in order to achieve satisfactory removal of the heaviest undesired fraction of the spent abrasives.

It should be noted that the invention is not limited to the above described preferred embodiment, but that various modifications, obvious to those skilled in the art, can be made without departing from the invention and the scope of the following claims.

What is claimed is:

1. Method for reclaiming used abrasives, which comprises forming a turbulent levitating fluidized bed of said used abrasives in a substantially horizontal elongated enclosure having a charging end, a discharging end and a porous bottom, in which enclosure the fluidized used abrasives are made to move from the charging end to the discharging end, said turbulent levitating fluidized bed being formed by blowing fluidizing air through the porous bottom of the enclosure so as to produce vigorous agitation or scrubbing action adapted to liberate adhering contaminants from the used abrasives, heating said fluidizing air to remove moisture when such is present in the used abrasives, and removing said contaminants and fines from said fluidized used abrasives by means of a plurality of suction outlets positioned in a predetermined sequence and at predetermined levels along said elongated enclosure.

2. Method according to claim 1, in which the porous bottom of the elongated enclosure contains a multitude of micro-perforations adapted to produce micro-jets of blowing air that generate the turbulent levitating fluidized bed which produces vigorous agitation or scrubbing action adapted to liberate adhering contaminants from the used abrasives.

3. Method according to claim 1, in which the used enclosure is vibrated.

4. Method according to claim 1, in which the used abrasives are charged continuously or intermittently into the elongated enclosure at said one end of the enclosure, which is its charging end, and reclaimed material is discharged at said other end of the enclosure, which is its discharging end, said elongated enclosure tapering downwardly from its charging end to its discharging end to facilitate movement of the abrasives along said enclosure.

5. Apparatus for reclaiming used abrasives having contaminants and fines therein, which comprises an elongated enclosure with a charging end, a discharging end and a porous bottom; means for continuously or intermittently charging used abrasives at the charging end; means for blowing fluidizing air through the porous bottom of said elongated enclosure so as to form a turbulent levitating fluidized bed of said abrasives therein and to produce vigorous agitation or scrubbing action adapted to liberate adhering contaminants from the used abrasives; means for heating the fluidized air; means for moving said fluidized bed of abrasives along the elongated enclosure from said charging end to said discharging end; a plurality of suction outlets positioned in a predetermined sequence and at predetermined levels along said elongated enclosure adapted to sequentially remove the contaminants and the fines from said used abrasives as they travel in the form of the turbulent levitating fluidized bed from the charging end to the discharging end of said elongated enclosure, thereby producing reclaimed abrasives at said discharging end; and means for collecting said reclaimed abrasives as they exit the discharging end of the elongated enclosure.

6. Apparatus according to claim 5, in which the porous bottom of the elongated enclosure contains a multitude of micro-perforations which produce micro-jets of blowing air that generate the turbulent levitating fluidized bed above said bottom.

7. Apparatus according to claim 5, in which said elongated enclosure is tapering downwardly from its charging end to its discharging end so as to facilitate movement of the fluidized abrasives along said enclosure.

8. Apparatus according to claim 5, in which means are further provided to vibrate said elongated enclosure.

9. Apparatus according to claim 5, in which the suction outlets are in the form of hoods connected to vacuum producing means.

10. Apparatus according to claim 5, in which three suction outlets are positioned and arranged as follows:

the first suction outlet, which is positioned close to the charging end of the elongated enclosure, is arranged so as to remove mostly volatile contaminants; the second suction outlet, which is positioned substantially in the middle of the elongated enclosure, is arranged to remove less volatile contaminants and some fines; and the third suction outlet, which is positioned close to the discharging end of the elongated enclosure, is arranged to remove mostly fines to a desired particle size.

11. Apparatus according to claim 10, in which the third suction outlet is provided with a higher degree of suction than the first and second suction outlets.

12. Apparatus according to claim 11, wherein the third suction outlet is provided with slotted orifices at adjustable levels so as to capture the heaviest fraction of the fines slated for removal.

* * * * *